United States Patent Office 3,707,589
Patented Dec. 26, 1972

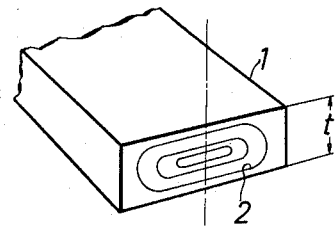
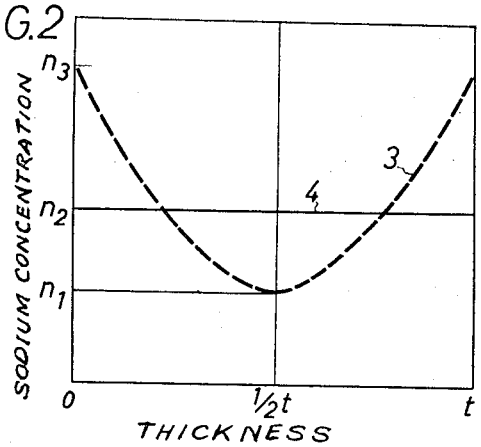
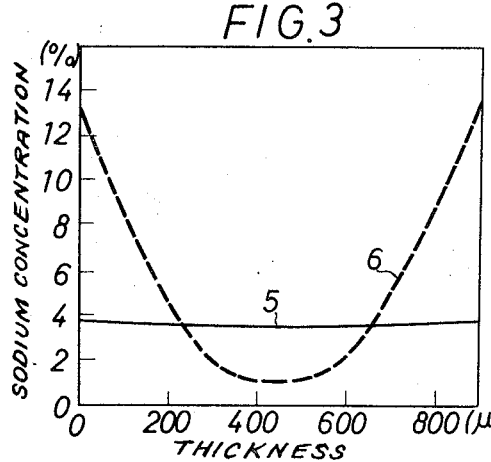
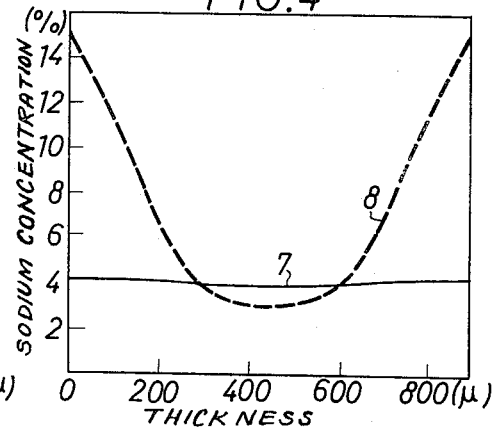
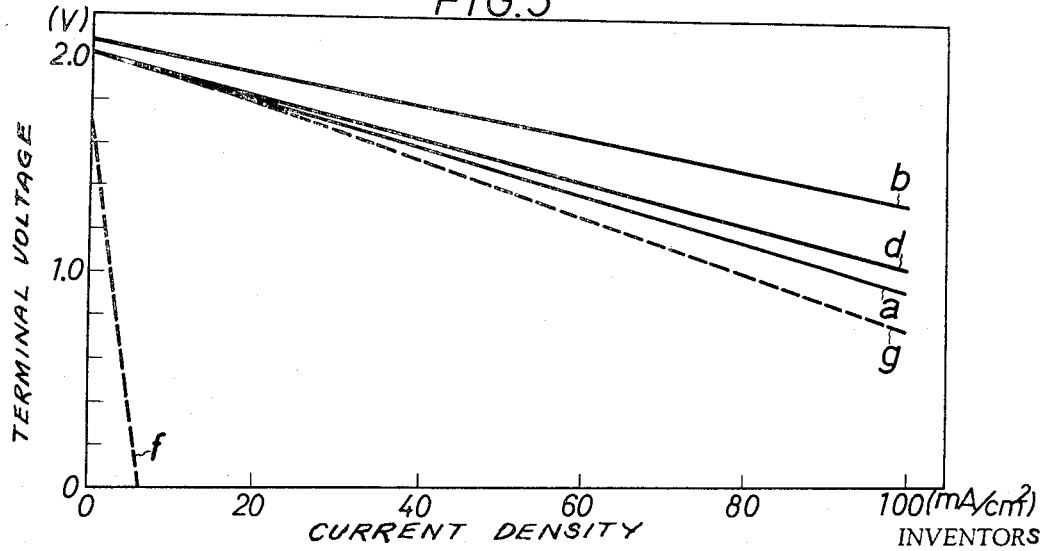

3,707,589
REHEATING A BETA-ALUMINA ARTICLE IN AN ALKALI METAL ATMOSPHERE TO IMPROVE ITS PERMEABILITY
Takewo Chiku, Toyota, and Kiyoshi Ninomiya and Hiroaki Hayashi, Nagoya, Japan, assignors to Kabushiki Kaisha Toyota Chuo Kenkyusho, Aichi-ken, Japan
Filed Apr. 13, 1971, Ser. No. 133,551
Int. Cl. C04b *35/10, 35/64, 41/02*
U.S. Cl. 264—82                                             11 Claims

ABSTRACT OF THE DISCLOSURE

A beta-alumina article permeable to sodium and potassium ions made by heating a sintered alpha-alumina article in the presence of sodium or potassium suffers from a lack of uniformity of conversion of alpha-alumina to beta-alumina, particularly in the center portion of the article. The uniformity is greatly improved by reheating this article at similar temperatures used in the first heating step in an atmosphere having a lower concentration of sodium or potassium than used in the first heating step. Following this second heating step the article is washed in water.

SUMMARY OF THE INVENTION

This invention comprises heating an alpha-alumina sintered material in an atmosphere containing the vapours of sodium, potassium or the oxide thereof at a temperature ranging from 1200° C. to 1700° C., as the first step, to impregnate said sodium, potassium, or the oxide thereof into said alpha-alumina sintered material and then heating again said resulting sintered and impregnated alpha-alumina material in an atmosphere containing a smaller amount of said gases of sodium, potassium or the oxide thereof than that of the atmosphere at the first step at a temperature ranging from 1400° C. to 1800° C., as the second step, to diffuse uniformly said sodium, potassium, or the oxide thereof impregnated into the material throughout the material, thereby yielding a product having substantially the same properties as beta-alumina insofar as capability of passing sodium, or potassium ions.

The primary object of the present invention is to provide a method of producing a material having substantially the same ion-permeable properties as beta-alumina.

Another object of the invention is to provide a method of producing a material having the above-mentioned properties and a dense structure and a high strength.

A further object of the invention is to provide a method of producing a product having the above-mentioned characteristics and a desired shape, and which is relatively easy and inexpensive to perform.

As used throughout this document, beta-alumina is defined as a crystalline material having layers of $Al_2O_3$ connected by Al—O bonds wherein sodium or potassium ions reside between the layers and bonds.

Where sodium is present the general formula of beta-alumina may be shown as $Na_2O.11Al_2O_3$, hereinafter termed sodium beta-alumina. According to Bragg, it is represented by the same formula.

Similarly, the general formula of potassium beta-alumina may be shown as $K_2O.11Al_2O_3$, and hereinafter is termed potassium beta-alumina.

BRIEF DESCRIPTION OF THE DRAWINGS

The novel features which are considered characteristic of the invention are set forth with particularity in the appended claims. The invention, itself, however, both as to its objects and advantages thereof, will best be understood from the following description of specific embodiments when read in connection with the accompanying drawings, wherein:

FIG. 1 is a fragmentary schematic view of a sintered material after the first step of the process of this invention illustrating a distribution of the sodium concentration in the section of the material.

FIG. 2 is a graph showing the sodium concentration distribution curve along the I—I line shown in FIG. 1.

FIGS. 3 and 4 are graphs showing the sodium concentration distribution curves through cross-sections of the materials after fabrication according to the method of the invention.

FIG. 5 is a graph showing the voltage-current curves of sodium sulphur batteries in which the plates prepared in accordance with the present invention are used as solid reaction zone membranes, or separators.

DETAILED DESCRIPTION OF THE INVENTION

The ion-permeable product comprising the subject matter of this invention is useful, and required as a solid reaction zone separator for a battery, for example, in a molten sodium-sulphur battery to produce an output energy per unit weight many times higher than those of conventional batteries. In a sodium-sulphur battery such a separator must be capable of perfectly separating the sodium and sulphur reaction materials and yet must pass sodium ions therethrough during the charging and discharging cycles. A potassium sulphur battery requires a similar separator which will pass potassium ions therethrough and simultaneously keep the reaction materials apart.

Although beta-alumina is known as the material capable of passing sodium and potassium ions, it has heretofore been extremely difficult to produce a beta-aluminum sintered product having excellent structural properties. Beta-alumina powder is pressed and sintered at a temperature above 1600° C. However, since beta-alumina converts into alpha-alumina ($Al_2O_3$) at a temperature above 1400° C., alpha-alumina is produced before sintering is completed. Thus a sintered beta-alumina plate having the desired strength and denseness of structure is not obtained using the conventional process.

If, with difficulty, as sometimes occurs, a sintered beta-alumina is produced, it is weakened by defects such as cracks appearing in many portions which is considered due to its deformation.

Therefore, the inventors have investigated and found a method of making an ion-permeable material different from the above-mentioned conventional method. The process of the invention comprises heating a sintered alpha-alumina member in an atmosphere containing the vapours of sodium, potassium, or the oxides thereof in two separate heating steps.

In the first heating step, said sintered alpha-alumina is heated in said atmosphere at a temperature ranging from 1200° C. to 1700° C., whereby said sintered alpha-alumina is impregnated with sodium, potassium or the oxide thereof.

Although the resulting material has the excellent strength and denseness of structure, the amount of said metals or the oxide of the metals impregnated varies depending on the heating conditions such as temperature and time. In many cases, the portion near the surface of the resulting material contains too much of said metals or metal oxide, sometimes as sodium or potassium aluminate, but the central portion does not contain enough and still retains alpha-alumina structure.

As a separator of a sodium sulphur battery, said material gives poor electric properties because sodium ions are prevented from passing through the separator by the alpha-alumina in the central portion and by the sodium or potassium aluminate produced near the surface portion.

The sodium or potassium concentration of the inventive material can be measured with electric beams by EPMA (Electron Probe Microanalyzer). Generally, said concentration distribution on the section of said material is like that shown in FIGS. 1 and 2, i.e., high concentration in the surface portion and low in the central. FIG. 1 shows the equal sodium or potassium concentration lines 2 on the section. FIG. 2 shows said concentration distribution along the thickness ($t$) direction, i.e., I—I direction in FIG. 1.

In FIG. 2, the ordinate represents sodium concentration (percent) and the abscissa represents the thickness from the upper surface to the lower surface of said material. The sodium concentration distribution line is represented by the broken line 3, and describes a parabola having the minimum concentration $n_1\%$ at the center portion (thickness is $\frac{1}{2}t$) and the maximum concentration $n_3\%$ at both the upper surface (thickness is $o$) and lower surface (thickness is $t$).

According to experiment, the permeability of sodium ions through said material mainly depends on the minimum sodium concentration, i.e., $n_1\%$ shown in FIG. 2, of the material. In order to improve the permeability, the minimum sodium concentration should be raised. And the heating time and the concentration of sodium oxide vapour in the atmosphere during the first step should be raised. The resulting material will have improved minimum sodium concentration but also will have harmful sodium aluminate ($Na_2O \cdot Al_2O_3$) in the parts near the surface. The sodium aluminate retards the passing of sodium ions. So the resulting material still does not have enough permeability to passage of ions.

In order to solve the above defects, the second heating step is added; i.e., heating the material impregnated with sodium, potassium or the oxide thereof at a temperature ranging from 1400° C. to 1800° C. in an atmosphere containing enough vapours of sodium, potassium, or the oxides thereof to prevent dispersing the metal or oxide already impregnated in the material from said material into the atmosphere. During the second heating step the atmosphere should contain a smaller amount of said vapours than the atmosphere of the first heating step.

Thus, during the second heating step, neither sodium, potassium, nor their oxides are introduced into the material or disseminated out of the material, but the metal or oxide is diffused uniformly within said material, i.e., the metal or oxide in the parts where much more of the metal or oxide than the average is contained, is diffused to the parts where less of the metal or oxide is contained. And the resulting material has a high minimum sodium or potassium concentration and low maximum sodium or potassium concentration resulting in an excellent permeability of sodium or potassium ions. The composition of said material is like the composition of beta-alumina. The ideal sodium concentration distribution is shown by line 4 in FIG. 2 with its concentration $n_2\%$.

During the above-mentioned second step of the process, a small amount of movement of sodium, potassium, or the oxide thereof between the atmosphere and the material containing said metal or oxide takes place. A material which has too much sodium oxide or potassium oxide as sodium or potassium aluminate in the portion near the surface will release a part of said oxide into the atmosphere. Contrariwise, a sintered alumina which lacks said oxide in the portion near the surface will receive a part of the oxide from the atmosphere.

The steps of the process according to this invention are explained more fully hereinafter.

First, a sintered alpha-alumina article is formed with a desired shape (for example, a separator of a sodium-sulphur battery) from an alpha-alumina powder by a well-known sintering method, which comprises pouring alpha-alumina powder into a mold, pressing said powder within the mold to form a green compact, and sintering the compact at a temperature between 1600° C. and 2000° C. Alternatively, the article can be carved out from a sintered alpha-alumina block.

The atmosphere containing sodium, potassium or the oxide thereof is made by a conventional method. Said atmosphere can be formed by heating a sodium or potassium containing material in the air. As a sodium containing material, Na, $Na_2CO_3$, $Na_2O$, $NaAlO_2$, $NaAlSiO_4$, $3Na_2O \cdot AS_2O_5$, $Na_2O \cdot Ta_2O_5$, $3Na_2O \cdot P_2O_5$, $Na_2ZrSiO_5$ or the like may be used. And as a potassium containing material, K, $K_2CO_3$, $K_2O$, $KAlO_2$ or the like may be used. The sodium or potassium containing material will decompose and release sodium oxide, potassium oxide, sodium or potassium vapour by being heated. The sodium and potassium vapour are oxidized with oxygen when present in an atmosphere and become sodium oxide and potassium oxide.

Any appropriate means for producing the required atmosphere may be utilized so long as a sufficient amount of sodium oxide or potassium oxide is continuously available for said heat treatment. For example, when a reversal flame-type heating furnace is used, the sintered alumina article is placed in said furnace and the furnace is kept at a temperature between 1200° C. to 1700° C. Sodium carbonate ($Na_2CO_3$) is placed in the neighborhood of the burner and is heated to decompose. The decomposition temperature is about 900° C. The generated vapour (sodium oxide) is continuously supplied into the furnace in regulated amounts and the furnace is carefully kept in the temperature range of 1200° C. to 1700° C.

Alternatively it is possible to mix a powder of material containing sodium or potassium with alpha-alumina powder and to place the mixture around a sintered alpha-alumina article. In order to make an atmosphere containing enough vapours of sodium, potassium, or the oxides thereof for impregnating said metal or oxide into the article, more than 30% by weight of the mixed powder should be the sodium or potassium containing material. Since it takes a relatively long time to impregnate said metal or oxide, it happens sometimes that said vapours disappear before completing the impregnation. Therefore, said article and powders should be put into a crucible with a lid which will effectively prevent the escape of the vapours.

Regarding the heating temperature during the first heating step, if this temperature is too high, the beta-alumina formed decomposes and reconverts back into alpha-alumina. However, it has been found that such decomposition depends on the concentration of sodium or potassium in the atmosphere such that as the concentration of sodium oxide or potassium oxide increases, a higher temperature for decomposing is required.

It is estimated that the decomposition of the sodium beta-alumina structure occurs at about 1900° C. to 2000° C. in an atmosphere containing a large amount of sodium oxide. A suitable heating temperature for promoting the impregnation of the sodium or potassium oxide into a sintered alpha-alumina article ranges from 1200° C. to 1700° C. Of course, there is no warning about the decomposition of the beta-alumina formed. The heating temperature below 1200° C. requires a long heating time to complete said impregnation.

During the second heating step in accordance with the invention, the atmosphere can be provided in the same way as in the first step. But the amount of the vapours of sodium, potassium, or the oxides thereof in the atmosphere must be less than during the first heating step and just enough to prevent dispersing said metal or oxide from the article impregnated with said metal or oxide. The amount of the vapours in the atmosphere is regulated by feeding the above-mentioned sodium or potassium containing material in an appropriate quantity per unit time, when a reversal flame type heating furnace is used, and by the ratio of said sodium or potassium containing material powder to the alpha-alumina powder when a crucible is used in a heating furnace.

The temperature during the second heating step is suitable in the range from 1400° C. to 1800° C. The impregnation of sodium, potassium, or the oxides thereof is not required during the second heating step, so the higher upper limit temperature (1800° C.) can be used rather than the upper limit temperature (1700° C.) of the first step. But use of a heating temperature higher than 1800° C. will damage said article due to the decomposition of the beta-alumina formed.

The heating time required during the second heating step can be shorter than that of the first heating step.

The product thus treated in the second heating step has a uniform sodium concentration, and sodium aluminate is not formed on the surface portion thereof. Even if a small amount of sodium aluminate should exist, it can be removed by washing with water.

DESCRIPTION OF PREFERRED EMBODIMENTS

For the first heating step according to this invention, admixed powders of sodium carbonate and alpha-alumina prepared in the weight ratios shown in the second column of Table I and having a total weight, in each case, of 300 grams were placed into a Tammann tube. Each high purity gas-tight alpha-alumina plate shaped from alpha-alumina powder and sintered at about 1750° C. was laid in said admixed powders and electrically heated at 1200° C. or 1500° C. for 3 to 48 hours. Each plate was about 38 mm. long, 30 mm. wide, and 0.60 mm. thick and weighed 2.6 grams.

Then during the second heating step, said resulting plate was placed again into a Tammann tube with the 300 grams of admixed powder shown in the sixth column of Table I, and heated at a temperature in the range from 1400° C. to 1750° C. for a period of time from 0.5 to 48 hours.

The average beta-alumina content of each plate after the first and second heating steps was measured by X-ray diffraction and shown in the fifth and ninth columns of Table I. Sample Nos. A to E, in the first column of Table I represent the products after the first and second steps, respectively, and Sample Nos. F and G represent the resulting materials after the same first heating steps as applied to Samples A and B. Hereinafter, said F and G are called comparative materials with Samples A and B.

One of the Samples A was cut through the central portion and analyzed, the distribution of the sodium concentration along the cross-section being measured by EPMA analysis. And one of the comparative Samples F with said Sample A was also cut and analyzed to determine the distribution of the sodium concentration. The distribution of the sodium concentration is shown in FIG. 3. The solid line 5 represents the distribution of the sodium concentration of the Sample A and the broken line 6 represents the sodium concentration distribution of the comparative material F. The comparative material F has a high sodium concentration, i.e., 13.5% in the portion near the surface but as low as about 1% in the central portion. The distribution curve is shown as a parabola high at both ends and with a low central portion. Compared with said comparative material F, the Sample A, in accordance with the present invention, shows about 3.6% sodium concentration uniformly throughout. The concentration in the central portion increased from about 1% to about 3.5%. On the contrary, the sodium concentration at both ends, i.e., the portions near the surface, decreased from about 13.5% to about 3.7%. It is believed that some parts of sodium in the portion near the surface were moved to the central portion and a small amount of sodium was released into the atmosphere during the second heating step.

TABLE I

| | The first heating step | | | | The second heating step | | | |
|---|---|---|---|---|---|---|---|---|
| Sample No. | Ratio of Na₂CO₃ to α-alumina by weight | Temp. (° C.) | Time (hr.) | Average β-alumina content, percent (wt.) | Ratio of Na₂CO₃ to α-alumina by weight | Temp. (° C.) | Time (hr.) | Average β-alumina content, percent (wt.) |
| A(F) | 3:2 | 1,500 | 3 | 52 | 1:9 | 1,700 | 1.0 | 88 |
| B(G) | 5:5 | 1,500 | 9 | 87 | 1:9 | 1,700 | 0.5 | 99 |
| C | 5:5 | 1,500 | 9 | 87 | 1:9 | 1,750 | 0.5 | 99 |
| D | 5:5 | 1,500 | 9 | 87 | 1:9 | 1,500 | 6.0 | 95 |
| E | 3:7 | 1,200 | 48 | 40 | 1:9 | 1,400 | 48 | 93 |

The sodium beta-alumina content of the Sample A was measured 88% by X-ray diffraction shown in Table I. The comparative F was 52%. There was no sodium aluminate in the Sample A but a little in the comparative material F. Furthermore there was no change in the thickness of said material during the second step, even if the thickness of the comparative material F increased to 0.90 mm. from 0.60 mm. during the first heating step.

One of the Samples B was cut and measured for the sodium concentration distribution in the same way as the Sample A. Also the comparative material G for the Sample B was measured for sodium concentration distribution. The results are shown in FIG. 4. The solid line 7 and the broken line 8 represent the sodium concentration distributions of the Sample B and the comparative material G, respectively.

The comparative material G has higher sodium concentration than the comparative material F as a whole, and especially in the portion near the surface. Further, in the same portion near the surface, a larger quantity of sodium aluminate than that of the comparative material F was detected by X-ray diffraction. This result is attributed to the longer heat treating time of Sample G than that of the comparative material F. The Sample B made by subjecting Sample G to the second heating step showed a uniformly diffused sodium concentration of about 4.2% and no sodium aluminate was detected. The sodium beta-alumina content according to the result of X-ray diffraction was very nearly 100%.

The Samples C, D and E were also tested in the same way as the Samples A and B, and high sodium beta-alumina contents and uniform sodium concentrations with no trace of sodium aluminate were found.

As shown by the above examples, even if too much sodium was impregnated into the sintered alpha-alumina plate, sometimes more than enough to form sodium aluminate during the first heating step, the application of the second heating step produced beta-alumina, or a similar structure, uniformly throughout the plate.

Next, said samples and comparative materials were used as separators in sodium-sulphur batteries to be tested for their electrical properties. The sample plates were washed with water and placed in sodium-sulphur batteries. Each battery comprised a container having a separator, or partition, formed of one of said plates, with molten sodium placed on one side of the separator and molten sulphur placed on the other, as the reaction materials, and thereafter maintained at 300° C. Conductive electrodes were inserted into the sodium and sulphur, respectively, to complete the battery. To obtain discharge curves, the two electrodes were short-circuited through a fixed external electrical resistance. The obtained voltage-current curves of said Samples A, B, D and comparative materials F and G during their discharging are shown in FIG.

5. A series of solid lines, a, b, and d represent Samples A, B, and D, respectively, and a series of broken lines f and g represent the comparative materials F and G, respectively, wherein the ordinate of the graph represents terminal voltage (V), the abscissa represents current density (ma./cm.$^2$). The Samples A, B, and D, according to the present invention, show the good performances as the separators. Especially Sample A shows a high electric property even though the same material just after the first heating step is the same as the comparative material F, which has a poor electric property and cannot be used in practice. This means that Sample A was greatly improved electrically during the second heating step. The other Samples B and D show improved electrical properties compared with the comparative material G. In addition to said Samples A, B and D, Samples C and E showed the same high electrical properties.

These high electric properties, namely the high permeabilities to sodium ions, are attributed to their high minimum sodium concentration and no resistance to ion flow by sodium aluminate which was formed in the surfaces of the plates during the first heating step, but decomposed during the second heating step.

In the foregoing paragraphs the invention has mostly been explained in detail as related to the cases in which a sintered alpha-alumina plate is placed in a high temperature atmosphere containing sodium or sodium oxide to thereby introduce sodium or sodium oxide into the plate. The chemical properties of potassium are very similar to those of sodium, and potassium beta-alumina and sodium beta-alumina have the same crystalline structure. Consequently, the same means and method explained above can be applied to producing materials containing mainly potassium beta-alumina.

For example, a sintered alpha-almina plate was heated in a high temperature atmosphere containing potassium or potassium oxide as the first heating step and the resulting material contained mainly potassium beta-alumina. Then, said material was buried in the admixture of 90% of potassium carbonate and 10% of alpha-alumina powder and heated at the second heating step. The resulting material was analyzed and found to comprise a high content of potassium beta-alumina without any trace of potassium aluminate. Also the potassium concentration distribution of said material was uniform and similar to the distribution of sodium previously explained. Said material has the property of passing sodium ions as well as potassium ions therethrough and can be used as a separator of a potassium-sulphur battery.

The embodiments of the invention in which an exclusive property or privilege is claimed are defined as follows:

1. In a method of producing a product of the beta-alumina type and having the property of passing sodium and potassium ions therethrough which comprises heating a non-permeable sintered article consisting essentially of alpha-alumina in a diffusing atmosphere comprising a vapor selected from the group consisting of sodium, potassium, and their oxides, at a temperature in the range of about 1400° C.–1700° C. until said sintered article is impregnated with sodium, potassium or the oxides thereof; the improvement consisting of subjecting said impregnated article to an additional heating step in the temperature range of 1400° C.–1800° C. in an atmosphere containing vapors of sodium, potassium, or their oxides maintained at a concentration lower than the concentration used in the first heating step and sufficient to prevent the metal or oxide in said impregnated article from dispersing from said article into the atmosphere, whereby the distribution of sodium, potassium, or their oxides in said impregnated article is made more uniform, and washing the article in water.

2. A method according to claim 1, wherein said atmosphere containing said vapour for both said heating steps is prepared by heating a sodium containing material in the presence of oxygen.

3. A method according to claim 2, wherein said sodium containing material is taken from the group consisting of sodium, $Na_2CO_3$, $Na_2O$, $NaAlSiO_4$, $3Na_2O \cdot As_2O_5$, $Na_2O \cdot Ta_2O_5$, $3Na_2O \cdot P_2O_5$, $Na_2ZrSiO_5$, and $NaAlO_2$.

4. A method according to claim 2, wherein during said first heating step said alpha-alumina article is immersed in a powdered admixture of more than 30%, by weight, of said sodium containing material and the rest of alpha-alumina powder and which is heated to form said vapour.

5. A method according to claim 2, wherein said alpha-alumina article after the first heating step is immersed in a powdered admixture of about 10%, by weight, of said sodium containing material and about 90% of alpha-alumina powder and heated according to the second heating step to form said atmosphere sustained at a concentration lower than the concentration used in the first heating step.

6. A method according to claim 5, wherein said sodium containing material is sodium carbonate.

7. A method according to claim 6, wherein said sintered alpha-almina article is immersed in a powdered admixture of 50% to 60% by weight of sodium carbonate and the rest of alpha-alumina powder and heated at about 1500° C. for 3 to 9 hours during the first step, then the resulting impregnated article is again immersed in a powdered admixture of about 10%, by weight, of sodium carbonate and the rest of alpha-alumina powder and heated at a temperature from 1500° C. to 1750° C. for 0.5 to 6 hours during the second heating step.

8. A method according to claim 1, wherein said atmosphere containing said vapour for both said heating steps is prepared by heating a potassium containing material in the presence of oxygen.

9. A method according to claim 8, wherein said potassium containing material is taken from the group consisting of potassium, $K_2CO_3$, $K_2O$ and $KAlO_2$.

10. A method according to claim 8, wherein said sintered alpha-alumina article is immersed in a powdered admixture of more than 30%, by weight, of said potassium containing material and the rest of alpha-alumina powder and which is heated during said first heating step to form said vapour.

11. A method according to claim 10, wherein said sintered alpha-alumina article is immersed in a powdered admixture of 50% to 60%, by weight, of potassium carbonate and the rest of alpha-alumina powder and heated at about 1500° C. for 3 to 9 hours during the first heating step, then the resulting impregnated article is again immersed in a powdered admixture of about 10%, by weight, of potassium carbonate and the rest of alpha-alumina powder and heated at a temperature from 1500° to 1750° C. for 0.5 to 6 hours during the second heating step.

References Cited

UNITED STATES PATENTS

| | | | |
|---|---|---|---|
| 3,488,271 | 1/1970 | Kummer et al. | 204—68 |
| 3,404,036 | 10/1968 | Kummer et al. | 136—153 |
| 3,446,669 | 5/1969 | Arrance et al. | 106—65 |
| 3,446,677 | 5/1969 | Tennenhouse | 106—65 |
| 3,468,719 | 9/1969 | Tennenhouse | 106—65 |
| 3,475,225 | 10/1969 | Tennenhouse | 106—65 |
| 3,515,679 | 6/1970 | Gaeth et al. | 252—477 |
| 3,427,373 | 2/1969 | Matsuo et al. | 264—65 |
| 3,591,668 | 7/1971 | Kirchner et al. | 264—65 |
| 3,655,845 | 4/1972 | Chiku | 264—65 |

DONALD J. ARNOLD, Primary Examiner

J. H. MILLER, Assistant Examiner

U.S. Cl. X.R.

106—65; 136—153; 264—65, 66, 340, 345